June 10, 1952  E. M. STAPLES  2,600,280
CIRCULAR CUTTING TOOL

Filed March 10, 1949  3 Sheets-Sheet 1

INVENTOR.
Evans M. Staples
BY
Wood, Arey, Herron & Evans
ATTORNEYS.

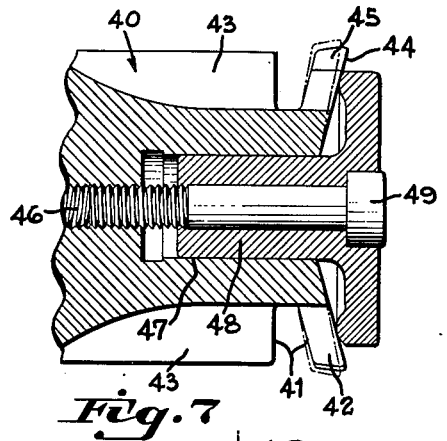
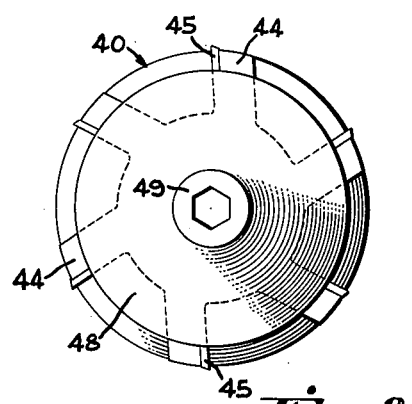
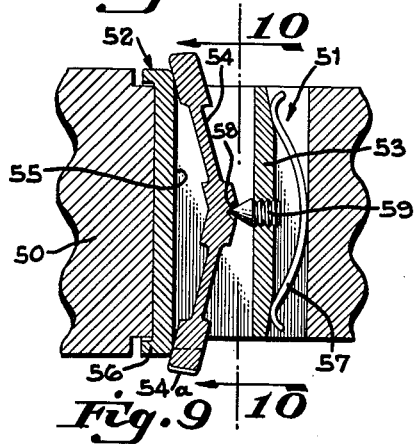
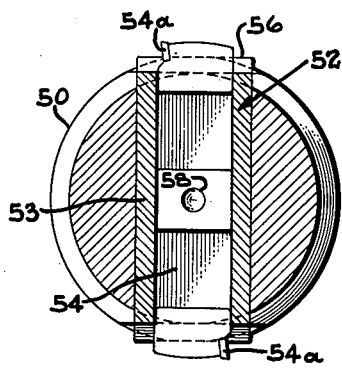
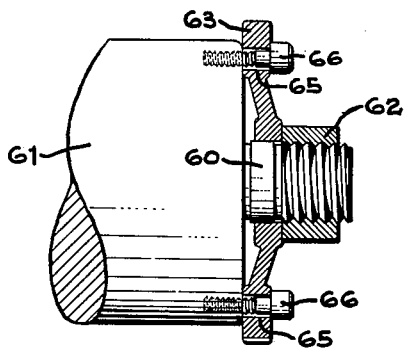
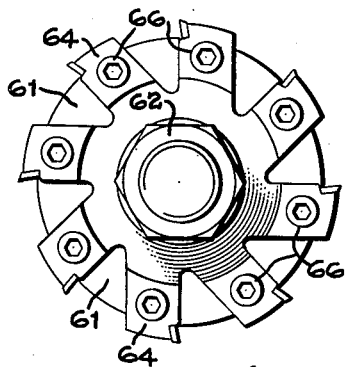

June 10, 1952  E. M. STAPLES  2,600,280
CIRCULAR CUTTING TOOL
Filed March 10, 1949  3 Sheets-Sheet 3

INVENTOR.
Evans M. Staples
BY
Wood, Arey, Herron & Evans
ATTORNEYS.

UNITED STATES PATENT OFFICE 2,600,280

CIRCULAR CUTTING TOOL

Evans M. Staples, Cincinnati, Ohio

Application March 10, 1949, Serial No. 80,754

12 Claims. (Cl. 77—58)

This invention relates to circular cutting tools for working metal, and the like, in boring, reaming, milling and related operations.

The principal objective of this invention has been to provide a circular cutting tool which displays the rigidity and stability of a solid tool when it is in use, but which is dilatable or expansible across the effective diameter of its cutting tips or edges in order that the tool diameter may be adjusted to the desired diameter or to compensate for the wear which has occurred upon its cutting edges. This wear is manifest over a period of time as a decrease in the dimension of the path cut by the tool, or as a decrease in the diameter of the hole which is bored or reamed by it. If the work is of precision nature, the tool when worn must be either reconditioned or discarded. In many instances, where the final dimension may not deviate from a predetermined standard by more than a few thousandths, or even a fraction of a thousandth of an inch, this reconditioning or discarding of worn tools constitutes an important item in the cost of manufacture.

Briefly, in accordance with this invention, an adjustable circular cutting tool is provided in which minor size adjustments may be accomplished by slight dilation or contraction of the effective diameter of the tool across its cutting tips. On the other hand the tool may be expanded appreciably, if it is worn or dulled so badly as to require regrinding or resharpening.

In the past, adjustable expansion reamers have been available but, in most instances, these tools embody slots to provide yieldability through which expansion may be effected, and these weaken the tools or impair the rigidity of the tools to such an extent that they tend to chatter when in cutting contact with a work piece. In other types of these tools, blades held by various means are seated on tapered foundation surfaces of the tool body, but, in such cases, it is virtually impossible to provide uniformity in the degree of adjustment of each blade. Therefore, as a practical matter, units of the latter type are almost always over-expanded and then reground to the intended diameter. U. S. Patents Nos. 2,093,742 and 2,093,986 which have previously been granted to me disclose expansible circular cutting tools in which an unsplit cylindrical body may be increased in diameter by a driven wedge-like plug having engagement with the tool along local areas of contact adjacent the cutting teeth. Such tools display the desirable rigidity of a solid tool and have found widespread usage, but the present invention is directed to a construction which is less expensive to employ, particularly in the fabrication of units of the larger diameters of, for example 1 to 5 inches or more.

Briefly, the tools of this invention comprise a cutting element of cone or cup shape in cross section, sufficiently thick to sustain substantial cutting loads imposed on teeth which are provided at its periphery, and means for exerting pressure axially of the element to flatten it or make it less cup or cone-shaped and thereby increase its diameter. Thus, in a typical embodiment an adjustable element of the type described is disposed between members engaging its opposed faces respectively adjacent the periphery at the one side and near the central portion at the other side, whereby pressure may be exerted axially on the element with sufficient magnitude to physically distort it from the plane of its primary configuration. Such compressive distortion, in a direction axially of the element, is manifest as a dilation or expansion of the tool across its cutting tips, the extent of such expansion being governed by the degree of pressure exerted upon the element to change its shape. Conversely, relaxation of the axial pressure on a tool which has not been compressed beyond its elastic limit produces a reduction in its overall diameter.

Such tools, employed for boring purposes in boring bars may be of two-lipped configuration, the lips constituting the cutting teeth and preferably being diametrically opposed, or the tools may be of multi-tooth configuration, the periphery of the adjustable cutting element being gashed or fluted to expose cutting teeth projecting at spaced intervals from the body of the cutting element. Units of either of these types may be employed as reamers, milling cutters, counterbores, or boring tools.

For purpose of adjustment or replaceability, the cutting element may be provided with a central bore adapted to fit snugly on a stub or pilot of a drive shank, and the axial compression which is required to affect the tool expansion may be provided by the disposition of a nut threaded upon the stub or pilot of the drive shank or a bolt threaded into it. Thus, a typical reamer constructed in accordance with this improvement may comprise a drive shank presenting a said face or shoulder, such that the cutting element will engage the face or shoulder at points adjacent the edges of its teeth while a nut bears upon the central portion of the opposite face of the cutter to exert an adjustable expanding pressure on the cutter.

Inasmuch as the adjustable member of such an assembly is subjected to substantial cutting loads when it is in use, it must be of substantial thickness; otherwise it would tend to give or flex in use and thus produce an imperfectly cut surface. At the same time, it is also apparent that the strength and solidity inherent in the substantial thickness at the body of the tool opposes the yieldability or deformability by which dilation is accomplished. However, through engagement of the one face of the tool at points adjacent its periphery and engagement of the opposite face of the tool at its central portion, a compound force may be exerted which permits expansion to be produced without exertion of extreme effort, particularly when the force is applied by adjustment of a threaded nut or bolt.

Flexure or yieldability of the cutting element from the plane of its original configuration is also inconsistent with that degree of hardness required to provide desired cutting action of the tool teeth, since hard metals usually are brittle. However, the invention, in a typical embodiment, contemplates a cutting element which is constructed of a relatively soft or yieldable metal, e. g., mild steel, at its body portion which the projected teeth comprise hard alloy, or sintered carbide material, applied to each tooth, as a facing, insert, or bit. Tools constructed in this manner, therefore, provide a high degree of durability and solidity in use in conjunction with a high degree of yieldability for adjustment purposes, and they permit a substantial degree of expansion to be obtained whereby the tool may be reset or reconditioned many times. On the other hand, if the tool is not intended for severe usage, or if the metal to be cut is soft and does not cause appreciable wear, the cutting element may be fabricated from one of the common metals or alloys which are sufficiently yieldable to accommodate at least a limited degree of take up or expansion.

A cutting element of the type just described has limited ability to transfer, from itself to the drive shank or tool holder, that heat which is generated during cutting. Hence, the temperature of the tool element may increase during cutting and this temperature increase may cause physical expansion of the effective diameter across the cutting teeth beyond the permissible limits. Problems of this nature frequently are encountered in work of a precise character where tolerances of only a few ten-thousandths of an inch are permissible. However, this invention contemplates several constructions which render the problem of expansion to be of no consequence. First, a construction is disclosed in which a relatively broad facial contact is provided between the bit and holder to facilitate the transfer of heat as required. On the other hand, the body of the tool may be made of a metal having a low coefficient of expansion whereby elevated temperatures may be sustained without significant increase in the actual diameter, whether or not the heat is transmitted to the shank or holder. Thus, I have determined that holes of large diameter (where problems of heat generation are most acute) may be bored within critically fine tolerances by fabrication of all or part of the body of the element of Invar metal, the faces of the teeth of such tools being equipped with sintered carbide or similar hard alloy tips.

Fabrication of tool elements in accordance with this invention is simple, readily performed and inexpensive, even in the largest sizes, since precision in the fabrication is readily obtained through conventional grinding methods by which all reamers or circular cutters are produced. The configuration of the body of the tool, to produce the desired cone or cup shape may be accomplished by ordinary turning, stamping or punching techniques. Subsequently, the cutting element is hardened, or the hard cutting faces of the teeth are applied, and then the tool is ground and is ready to be used. These units, therefore, can be produced at much less cost than slotted expansible reamers or the solid plug type reamers which have been disclosed in my aforesaid patents.

From the foregoing discussion of the principles upon which the invention is predicated and the following detailed description of typical embodiments of this invention, those skilled in the art will comprehend various modifications to which the invention is susceptible within the meaning of my claims.

In the drawings:

Figure 7 is a side elevation of a modified form of tool.

Figure 8 is an end view of the unit shown in Figure 7.

Figure 9 is a section view which illustrates a two lipped cutter and holder assembly disposed within a boring bar.

Figure 10 is a sectional view taken on the line 10—10 of Figure 9.

Figure 11 is a sectional view illustrating another modified form of cutter construction in accordance with this invention.

Figure 12 is an end elevational view showing the assembly of the cutter of Figure 11 with a tool holder.

Figure 1:
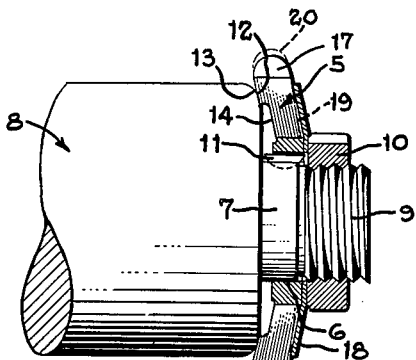
Figure 1 is a sectional view of a typical boring bar and associated tool element embodying the present improvements.
Figure 2:
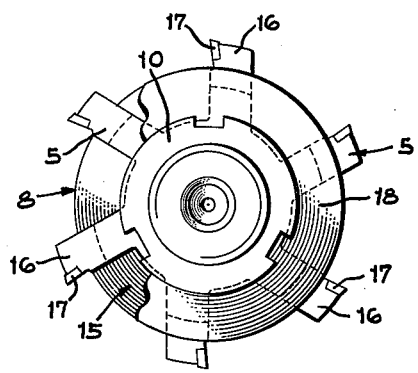
Figure 2 is an end view of the tool shown in Figure 1.

The adjustable cutting element indicate typically at 5 in Figure 1 is of cup or cone configuration in cross section with the central portion thereof being bored at 6 for reception upon a pilot or stub shaft 7 of a shank or holder indicated generally at 8. This holder, like the others which are shown and discussed herein, may be of the length desired and at its far end (not shown) it may be of conventional construction embodying a tapered portion adapted for reception in a driving socket or other suitable means by which the holder 8 can be supported or rotated.

The pilot 7 is threaded as at 9 to carry a nut 10, and, for positive driving connection between the cutter element 5 and the holder 8, the stub shaft 7 may be equipped with one or more keys 11 which are received in suitable keyways located in the bore 6 of the cutting element. It is desirable that the cutting element fit the stub shaft 7 snugly so that the cutter will be mounted concentrically on the holder.

The nut 10 engages the cutter 5 at the outer endwise portion thereof adjacent the bore 6, this portion of the cutter preferably being flat for facial contact between nut and cutter. From this central portion, however, the cutter, in cross section, diverges conically for example at an angle of about 10 degrees to 20 degrees such that the outer peripheral portion of the opposite face thereof is offset or resides in a plane which is spaced from the plane of the front face. The endwise portion of the drive shank constitutes a seat for this outer annular portion of the cutting element, as along the line 12. This portion of the drive shank may be rounded as at 13. The central portion of the cutting element may be recessed annularly at 14.

To provide a plurality of cutting teeth at the periphery, the cutting element 5 is gashed at spaced intervals about the periphery, these grooves constituting flutes in the areas indicated generally at 15. Tooth portions 16 are thus delineated about the periphery of this member, as many teeth being provided as are required by the service which is expected of the tool in accordance with accepted tool design practice. Each tooth of the tool shown in Figure 1 is faced with a sintered carbide member 17 which is seated and brazed in a recess provided for it. A washer 18 may be disposed intermediate the nut 10 and the outer face of the cutter 5 to facilitate the collection of heat from the cutter and direct it to the nut and shank if the tool is to be used for relatively heavy cuts where undue tool expansion is to be avoided. Washers made of copper or other good heat conductive metal are suitable for this purpose.

In the preparation of a tool of the type shown in Figure 1 the cutting element is disposed upon the stub shaft and the nut is tightened preferably to a degree which stresses the cutter element without expanding it appreciably, that is no more than approximately .003 to .005 of an inch beyond its original relaxed diameter. For perfect concentricity the periphery of the cutting element may then be ground while the tool holder is held between centers. It is then ready for use. After being used repeatedly to an extent that the overall diameter across the cutting teeth is reduced beyond a given diameter, the nut is engaged by a wrench and tightened so as to exert a greater pressure on the face of the cutting element and thereby cause it to yield or be deformed and assume a flatter shape in cross section. The position of its face upon such adjustment may reside along the dotted line 19. This axial compression is attended by a dilation in diameter and the outer extremities of the cutting teeth 17 now reside in a position illustrated diagrammatically by the dotted line 20. This diameter may differ from the preceding diameter by merely a few thousandths of an inch, to as much as .015 or .020 inch, or even more depending upon the relative over-all diameter of the tool, the cone angle or degree of cut of the cutting element, and the extent to which the tightening of the nut has caused the tool to be deformed. However, the displacement of the cutting teeth is uniform from tooth to tooth. The original concentricity is preserved and unless the teeth are worn very badly, they need not be resharpened. If they are worn very badly, they may be ground upon their facial surfaces to restore sharp cutting edges. This face grinding may or may not cause the overall or effective cutting diameter to be changed, depending upon the relief or clearance initially provided in each tooth. On the other hand, if the tool has suffered severe wear, then it may be expanded sufficiently to permit the outer diameter to be circle and relief ground so as to refinish the teeth at the periphery, whereby the unit is restored to its original condition. Since such reconditioning may involve the grinding away of only .003 to .005 inch from the net diameter, each tool may be reconditioned 3 to 5 times or more before expansibility is lost in respect to a given reference diameter, although, after that, the tool still may be used for boring holes which are of less than standard size. If the cutting element is over expanded beyond an intended diameter the nut may be backed-off gradually and the tool diameter across the teeth will decrease gradually, provided that the element has not been stressed beyond its elastic limit in the preceding expansion adjustment.

It is usually inconvenient and expensive to dismantle a tool holder from a machine, especially if the machine is of the multiple head type. The tool shown in Figure 3 comprises an expansible cutter assembly which may be demounted as a unit from the drive shank or tool holder. This construction permits an operator having two or more such tool heads, to use one in the machine while the other is being adjusted, reground or reconditioned in the tool room. Consequently, the shut-down time of the machine is minimized. In this construction the tool holder 22 is provided with a stub shaft 23 and nut 24 as described in Figure 1, but the stub shaft receives a carrier comprising a collar indicated generally at 25 which is keyed to the stub shaft by key 26. The collar is provided with a skirt portion 27 upon which the cutter element 28 is mounted. Outwardly of the skirt portion 27 beyond the cutter, the collar is threaded to receive a compression nut 29. In this case, the cutter is keyed to the skirt of the collar by the key member 30. Hence, the cutter element 28 is adjustably mounted on the sleeve member 25 and the sleeve member 25, in turn, is removably mounted upon the stub 23 of the holder. Adjustment of diameter in this instance is provided through the tightening of the nut 29 which the nut 24 bears against the end of the sleeve 25 to hold the assembly firmly on the drive shank. Upon loosening nut 24 the carrier and associated tool may be removed from the holder.

Figure 3:
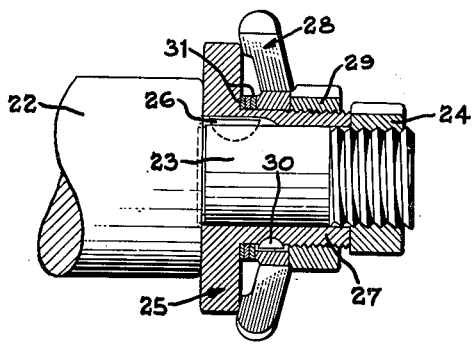
Figure 3 is a side elevation of a modified form of tool embodying a collective tool and holder ring assembly which is adapted to be disposed as a unit upon a pilot or a boring bar.
Figure 4:
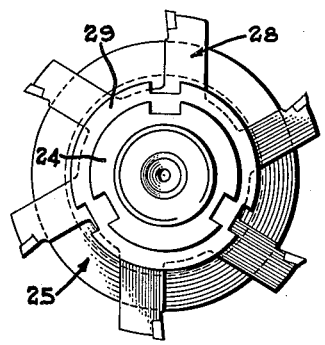
Figure 4 is an end view of the construction shown in Figure 3.

For maximum rigidity of the tool shown in Figure 3, as well as in the tools shown in the other illustrations, a plurality of thin shims 31 may be mounted at the back face of the central portion of the cutter to sustain the axial load exerted by the diameter adjustment nut. When these shims are utilized, an adjustment is effected by removing the nut and cutter, then removing one or more of the shims, replacing the cutter and tightening the nut until its thrust causes the cutter to bear firmly on the shims. Cutters constructed in this manner are extremely rigid and have all of the attributes of a solid tool but still may be expanded diametrically.

Figure 5:
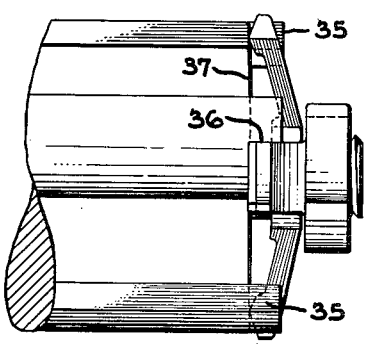
Figure 5 is an end elevation of a tool and holder assembly of the type shown in Figure 1 but embodying positive drive connection between the bar and cutting element.
Figure 6:
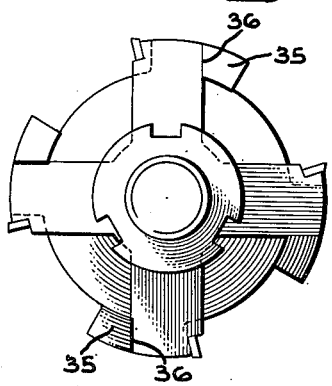
Figure 6 is an end view of the assembly shown in Figure 5.

In the construction shown in Figure 5, drive keys or drive lugs 35 are provided on the drive shank or holder of the tool assembly for abutment of rear face 36 of the projecting tooth portions of the element. The drive lugs 35 for this purpose may project endwisely beyond the shoulder face 37 of the holder, which is abutted by the cutting element, the other details of construction being similar to those just described. This type of unit is useful where the tool is required to sustain heavy interrupted cuts which, through their intermittent impact on the cutting teeth, might tend to distort them.

The cutter shown in Figures 7 and 8 is integral with the shank or holder, the whole unit being made of hardenable tool steel or the like, which will yield without cracking when hardened, or made of a mild steel or alloy with hard metal inserts or bits attached to the cutting teeth at the exposed faces thereof. In this unit, the endwise portion of the body 40 of the tool has a circumferential groove or neck 41 which delineates a cutting portion 42 projecting therebeyond. The tool at its endwise portion is provided with two, or a plurality, of flutes or gashes 43 which form cutting faces 44. In the construction shown, these cutting faces comprise hard metal bits or inserts 45 which may be brazed in place.

The central endwise portion of the holder 40 is bored and threaded as at 46 and is counterbored as at 47 to provide a recess or seat for the skirt portion of an expander member 48. The expander is of sufficient diameter to engage the cutting portion of the tool 42 adjacent the outer periphery of the teeth thereon. An adjustment bolt 49, which may have a head socketed for the reception of a wrench, passes axially through the expander member 48 into threaded engagement with the bore 46 of the tool head.

It is to be noted that the outer face of the tool element 42, in the construction shown in these figures, is chamfered inwardly, whereby tightening adjustment of the bolt 49 causes the expander 48 to bear rearwardly upon the outer peripheral portion of the toothed cutter and thereby dilate it in the manner previously described. For this purpose, the outer peripheral portion of the expander part 48 may embody an annular boss at the area which engages the cutter.

A conventional reamer of the type commonly used in the art frequently has teeth or blades of an elongated nature residing longitudinally on the body of the tool. Such devices are constructed upon the theory that the elongated blades guide the tool in the hole which is being bored or reamed by it and thereby help produce holes which are straight. Actually, however, these elongated blades are usually smaller in diameter at their back end than at their front, for clearance purposes and the guiding function is more theoretical than actual. However in accordance with the constructions of the present invention, a true piloting function may be provided by the portion of the tool holder which is behind the cutting teeth, if that portion of the holder is only a few one-thousandths of an inch smaller in diameter than the actual cutting teeth of the tool. This is illustrated typically in Figure 7, though the principle may be employed in the other embodiments which are disclosed. For heavy roughing cuts such construction is not necessary, but it is desirable in a so-called finishing reamer which is employed to remove only the last few thousandths of an inch from a bored hole and impart a fine surface to the interior of the hole through which it is passed. Also, for producing a high surface finish the trailing portions of the actual cutting teeth may be made slightly smaller in diameter than the leading portions, as indicated on an exaggerated scale in Figure 7.

Boring mills of the type employed for working on large castings and the like employ a boring bar which is rotatable and longitudinally feedable, the free end of the bar being guided and supported in an outboard journal. Such a boring bar conventionally carries a 2-lipped cutting blade which, when worn either is replated, to bring it up to the standard diameter, or is discarded. An adjustable tool insert for a boring bar of this type is illustrated in Figures 9 and 10. The boring bar 50 is provided with a cross slot indicated generally at 51 which usually extends diametrically through the boring bar. The cutter assembly shown in Figure 9 is indicated generally at 52, and it comprises a cutter casing 53 in which the cutting element of the adjustable tool 54 is disposed. Thus, the casing 53 may be of box-like construction, its outer dimensions being such that it will fit in the cross slot 51 of the boring bar 50. But the casing also has an aperture 55 in which the cutting element 54 is disposed. One end of the casing bears against one end of the slot 51 in the boring bar, and this end of the casing may be equipped with flanges 56 which hold it loosely in the boring bar such that the entire casing floats relative to the bar. The casing is of such length that its opposite end is spaced from the opposite end of the boring bar slot, and a leaf spring 57 is positioned between the two, so as to hold the casing in place while still allowing it to move, and thereby align itself to a hole previously bored.

Cutting element 54 of this assembly is of conical configuration and presents cutting tips or teeth 54a at points upon its periphery, while the central portion of the bar contains a central seat 58 which receives the point of an adjustment screw 59 carried in the end wall of the casing. The entire casing and cutter assembly may be removed from the slot in the boring bar by pulling the casing against the spring 57 a distance sufficient for the flanges 56 to clear the endwise portion of the bar slot, after which the unit may then be moved sidewisely and taken from the bar. When the unit is demounted the adjustment screw 59 is accessible and may be tightened to expand the cutter after which the unit can be reinstalled in the boring bar for use.

For heavy roughing cuts, where severe strain is imposed upon the teeth, the constructions shown in Figures 11–16 may be utilized. The cutting element of the tool of Figures 11 and 12 is provided with a central portion seated snugly upon a projecting stud 60 of a tool holder 61, and this central portion is engaged by an adjustment nut 62, as previously described in respect to Figure 1. However, the outer peripheral portion, at the rearward face or mouth of the cutter element 63, is substantially flat so as to engage the endwise face of the tool body, and derive direct support therefrom over a substantial area and also to be in heat-transmitting contact therewith. In this tool the teeth 64, delineated by flute grooves 65, are bored for the reception of screws 66 which are threaded into bores provided in the endwise portion of the body 61. The holes in the teeth 64 are larger than the diameters of the lock screws 66 to permit radial movement of the teeth. Therefore, to adjust this unit, screws 66, which may be of the socket-head type, are loosened, the nut 62 is then tightened to expand the tool to the desired degree, and then screws 66 are retightened to firmly hold the teeth against the body of the tool in their adjusted position. Such expansion is obtained because of the offset or angular relationship between the central portion of the cutting element which is engaged by the nut 62 and the peripheral portion of the cutting element which is engaged by the tool holder 61.

Figure 13:
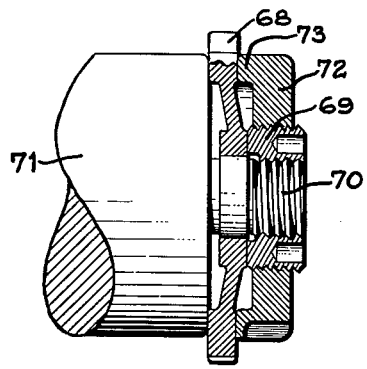
Figure 13 is a cross sectional view of a modified form of the tool showing it in place on a tool holder.
Figure 14:
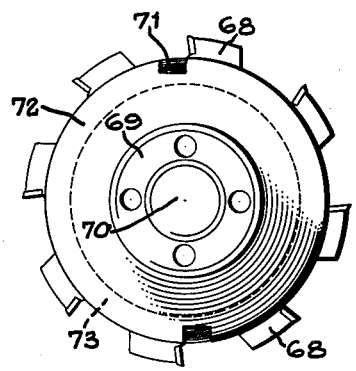
Figure 14 is an end elevational view of the tool shown in Figure 13.

A modified form of construction employing a lock ring in place of the lock screws 66 of the tool just described is shown in Figures 13 and 14. Here the endwise central portion of the cutter element 68 is engaged by the nut 69 which is threaded upon a projecting stub 70. The nut 69 has sockets in its endwise face for the reception of a spanner wrench by which the nut may be adjusted. This nut, in addition, is threaded at its outer periphery for the reception of a lock ring 72 having an annular boss portion 73 bearing upon the cutting elements 68 adjacent its outer periphery and thereby fastening this element against the shoulder of the tool body 71. Clamp ring 72 has notches or apertures for the reception of another spanner wrench by which it may be tightened.

Figure 15:
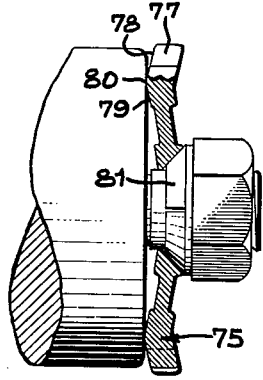
Figure 15 is a cross sectional view of a modified tool which is ground off angularly at the rear face to provide a line contact between the tooth members and the supporting shoulder of the shank.
Figure 16:
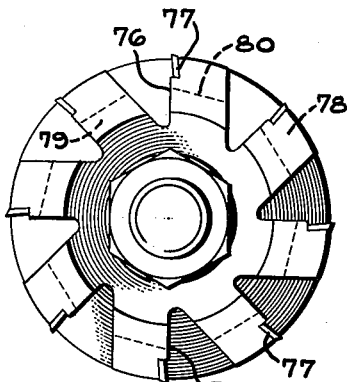
Figure 16 is an end elevational view of the tool shown in Figure 15.
Figure 17:
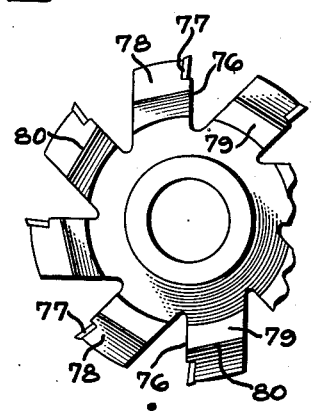
Figure 17 is a fragmentary elevational view showing the rear face of the tooth members of the tool shown in Figures 15 and 16.

Because of the arcuate or concave nature of the back faces of the teeth of a conical or cup shaped element the contact between this element and the shoulder of a tool holder may occur at only two points adjacent the edges of each tooth. Figures 15, 16 and 17, however, illustrate a construction in which full line contact for each tooth is provided between the back face of the cutting tool and a flat face on the supporting element on the tool holder. In these constructions the central portion of the tool is of cup or conical construction to provide expansion in accordance with the principles previously discussed, while the outer peripheral portion is angulated oppositely, as indicated generally at the portion 75 in Figure 15. The cutting element is fluted as at 76 to define the cutting teeth 77, but, in this instance, the outer portion of each tooth is made flat or planar and the adjacent oppositely inclined surface of each tooth also is made flat or planar so that the traces defined by the planes of these flat faces are straight lines which constitute the line of contact of the cutting element with a flat supporting surface disposed transversely of the axis of relative rotation of the tool. More specifically, as shown in Figure 17, the outermost portion 78 of each tooth is a flat surface, as produced, for example, by grinding that surface of each tooth individually. The adjoining oppositely inclined surface 79 of each tooth also is made flat in similar manner and resides at the appropriate angle, so that the two surfaces 78 and 79 meet one another in a straight chordal line or contact ridge line 80. Therefore, contact of the element with the support along such lines, 80 one for each tooth, provides a rigid mounting without utilization of the extra screws or clamp rings shown in Figures 11–14. The tool is expanded in the manner previously described.

Figure 15 also disclosed the provision of a split washer 81 having an internal diameter dimensioned to fit over the stub shaft of the tool holder and a concentric outer periphery which is of conical shape and which is adapted to be received in a complementary conical recess in the adjustable cutter element. As the adjustment nut is tightened the washer is wedged between the stub shaft of the holder and the recess of the cutter to hold the latter precisely in concentric position of the holder.

Figure 18:
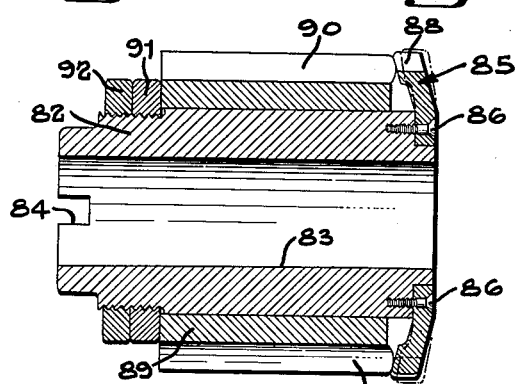
Figure 18 is a cross sectional view of a further modified form of the tool.
Figure 19:
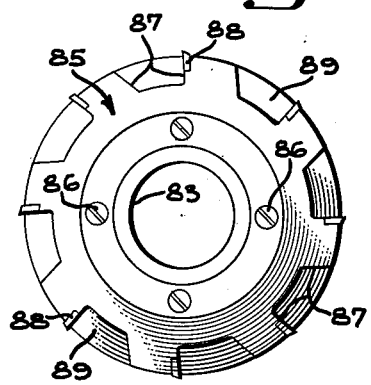
Figure 19 is an end elevational view of the tool shown in Figure 18.

For many machining operations shell reamers are used, comprising bladed units which may be disposed over a stub shaft of a holder. Figures 18 and 19 illustrate a shell reamer which is of an adjustable nature embodying the present improvement. This reamer consists of a sleeve-like body 82, bored as at 83 to be received upon the projecting shaft or stud of a shell reamer holder. If the reamer is to be held rigidly upon the shoulder and is not to float in respect to it, then the bore 83 may be tapered slightly. The back portion of the body of the reamer is transversely slotted, as at 84, for the reception of a driving dog. An expansive cutter element 85 of conical configuration is fastened to the forward end of the body 82, this attachment being of a rigid nature either through screws 86 or through brazing. The cutter element 85 is fluted, as at 87, and presents cutting teeth 88. A sleeve 89 fits around the outside of the body 82. This sleeve is behind the cutting teeth and also is fluted as at 90 as to provide for the passage of chips or for the passage of coolant.

In the alternative, this sleeve may be solid, if clearance is of no importance. The back portion of the body 82 is threaded to carry an adjustment nut 91 and a lock nut 92, the adjustment nut being arranged to bear upon the back face of sleeve 89 and so move it forwardly. The front face of sleeve 89 is configurated to engage the outer peripheral portion of the cutter 85 adjacent the cutting teeth 88 thereof. Since the central porion of he cutting element 85 is fastened to the body 82, it will be seen that the tightening of the adjusment nut 91 will cause the sleeve 89 to bear upon the outer portion of cutting element 85 to cause it to yield in a forward direction. This movement, because of the conical or cupped construction of the cutter, is accompanied by an expansion of the diameter across the cutting teeth. When the adjustment is made, the lock ring 92 is tightened and the tool is ready for use. In this reamer, as in others illustrated, the outermost diameter of the sleeve 89 may be just a fraction of an inch smaller than the diameter across the cutting teeth so that the sleeve functions to guide the tool in a linear direction through the hole portions which have been bored by the teeth. Units of this type are very satisfactory for finishing operations. Where work of the most precise character is required and expansion due to heat must be avoided, the body of the cutter may conveniently be fabricated from one of the known metals having a low coefficient of expansion of which Invar is typical.

Configuration of the actual cutting teeth of the expansible element may be in accordance with good tool designing practices, as to rake and clearance angles and the like. The teeth may be disposed on either positive or negative rake angles as desired.

Having described my invention, I claim:

1. A circumferentially dilatable cutting tool adapted to be mounted centrally on the end of a holder under axially adjustable compression, said tool comprising a resilient spider constituted by a central body configured to cooperate with fastening means for attaching the spider to the end of the holder and axially angulated resilient arms extending from the body, said arms terminating in cutting tips defining, in rotation, a circle, the plane of which is offset axially in relation to the spider center, whereby adjustment of compression dilates the spider.

2. A circumferentially dilatable cutting tool adapted to be mounted centrally on the end of a holder and to be held to the end of the holder by axially adjustable compression, said tool comprising a central portion having a plurality of resilient members diverging therefrom, the central portion being configured for attachment to the center of the end of a holder, and circumferentially spaced cutting tips exposed marginally at the ends of the said resilient members, said cutting edges being equidistant from the central axis of the central portion and the outer ends of said resilient members being offset axially in relation to the center portion whereby increased axial compression of the tool expands its diameter.

3. A chip cutter assembly for rotary boring, reaming, and milling operations, comprising, a cutting tool having a hub which contains a central aperture; a tool holder having a shaft positioned in said aperture and having abutment shoulder means residing outwardly beyond said shaft, said cutting tool hub having arms extending therefrom in generally radial directions, but also diverging angularly with respect to the hub axis, and extending into engagement with said abutment shoulder means, the said arms being yieldable in their said axial direction of divergence and being formed with cutting teeth which are spaced equidistantly from the hub axis, means constituting a rotary driving connection between said cutting tool and tool holder, and means carried by the said tool holder for exerting an axial compressive force upon said cutting tool hub which is sufficient to bend the arms and make them more divergent with respect to the hub axis, for coincidental expansion of the diameter across said cutting teeth.

4. A chip cutter assembly for rotary boring, reaming, and milling operations, comprising, a cutting tool having a hub portion and a plurality of arms extending approximately radially outwardly therefrom in planes diverging angularly from the axis of said hub portion, a tool holder in rotary driving connection with said cutting tool and providing abutment shoulder means spaced axially from said hub portion and residing in engagement with said arms adjacent their extremities, the said arms being yieldable in the direction of the divergence from the hub axis and being formed with cutting teeth which are spaced equidistantly from the hub axis, and means for exerting an axial pressure upon the tool which is sufficient to bend the arms and make them more divergent with respect to the hub axis, for coincidental expansion of the diameter across said cutting teeth.

5. A chip cutting tool for rotary boring, reaming, and milling operations, comprising, a central hub which is adapted for engagement with a tool driver, the said hub having at least two arms extending outwardly therefrom in approximately opposite directions, the said arms residing on axes divergent with respect to the axis of said hub, to provide a shape which, in rotation about the axis of said hub, defines a concavo-convex form, the said arms being yieldable in the direction of their divergence from the axis of said hub and having cutting teeth at their extremities which are spaced equidistantly from the axis of said hub, the said tool, by virtue of the yieldability of the arms, being expansible in diameter in consequence to the exertion of a force axially in respect to the hub, which is sufficient to make the arms more divergent.

6. An expansible chip cutting tool for rotary boring, reaming, and milling operations, comprising, a central hub which is adapted for attachment to a tool driver, the said hub having at least two arms extending therefrom in approximately opposite directions and residing on axes diverging from the axis of said hub, to provide a shape which, in rotation about the axis of said hub, defines a concavo-convex form, the said arms being yieldable in the direction of their divergence from the hub axis and having cutting teeth at their extremities which are spaced equidistantly from the axis of said hub, the said tool being fabricated, at least in part, from a metal having a low coefficient of expansion, whereby its cutting size is not appreciably affected by change in its temperature, but being expansible in cutting size in response to the application of a force exerted axially with respect to said hub, which is sufficient in magnitude to make the said arms more divergent with respect to the hub axis.

7. An expansible chip cutting tool for rotary boring, reaming, and milling operations, comprising, a central hub which is adapted for attachment to a tool driver, the said hub having a plurality of arms extending therefrom, the said arms residing on axes diverging from the axis of said hub, to provide a shape which, in rotation about the axis of said hub, defines a concavo-convex form, the said arms being of reduced thickness between their extremities and said hub to provide yieldability thereof with respect to the axis of said hub, and having cutting teeth at their extremities which are spaced equidistantly from the hub axis; the said tool, by virtue of the yieldability of the arms, being expansible in cutting diameter in consequence to the application of force which is axial in respect to the hub, and which is sufficient to make the arms more divergent with respect to the hub axis.

8. An expansible chip cutting tool for rotary boring, reaming, and milling operations, comprising, a hub providing a central axis of rotation, a plurality of arms diverging substantially symmetrically from the said hub in both radial and axial directions in relation thereto, the said arms having cutting teeth at their extremities which are spaced equidistantly from the said central axis of rotation, and the said arms being yieldable in the said axial direction of their divergence, whereby the diameter of a circle generated by the cutting teeth in rotation of the tool about the central axis may be increased, without stressing the arms in circumferential direction, in consequence to the application of an axial force which is sufficient in magnitude to increase the axial divergence of the arms.

9. An expansible chip cutting tool for rotary boring, reaming, and milling operations, comprising, a hub providing a central axis of rotation, a plurality of arms diverging substantially symmetrically from the said hub in both radial and axial directions in relation thereto, the said arms having cutting teeth at their extremities which are spaced equidistantly from the said central axis of rotation, and the said arms being elastically deformable in the said axial direction of their divergence, whereby the diameter of a circle generated by the cutting teeth in rotation of the tool about the central axis may be increased, without stressing the arms in circumferential direction, in consequence to the application of an axial force which is sufficient in magnitude to increase the axial divergence of the arms.

10. A chip cutter assembly for rotary boring, reaming, and milling operations, comprising, a cutting tool having a hub, a tool holder engaging said hub and having abutment shoulder means residing outwardly therefrom, said hub having arms extending therefrom in generally radial directions, but also residing in planes diverging angularly from said hub and extending into engagement with said abutment shoulder means, the said arms being yieldable relative to said hub and being formed with cutting teeth which are spaced equidistantly from the hub axis, driving means in connection with the said tool holder for engaging the arms near their outer extremities, and means carried by the said tool holder for exerting an axial pressure upon said hub which is sufficient to bend the arms and make them less divergent with respect to the hub for coincidental expansion of the diameter across said cutting teeth.

11. An expansible chip cutting tool for rotary boring, reaming, and milling operations, comprising, a hub providing a central axis of rotation, a plurality of arms diverging substantially symmetrically from the said hub in both radial and axial directions in relation thereto, the said arms having cutting teeth at their extremities which are spaced equidistantly from the said central axis of rotation, and the said arms being yieldable in the said axial direction of their divergence, whereby the diameter of the circle generated by the cutting teeth in rotation of the tool about the central axis may be increased in consequence to the application of an axial force which is sufficient in magnitude to change the axial divergence of the arms, the said arms, at areas adjacent their extremities, having facial portions residing in a common plane and constituting abutment surfaces adapted for engagement with a tool support.

12. An expansible chip cutting tool for rotary boring, reaming, and milling operations, comprising, a hub having a central aperture, a tool holder having a shaft engaging the said aperture and having abutment shoulder means residing outwardly beyond said shaft at one side of said hub, the said tool holder having compression means on said shaft at the other side of said hub, a plurality of arms diverging substantially symmetrically from said hub in both radial and axial directions in relation to said shaft and being supported by said abutment shoulder means near the outer extremities of said arms, the said arms having cutting teeth at their extremities which are spaced equidistantly from the axis of said shaft, and the said arms being yieldable in the said axial direction of their divergence, whereby the diameter of a circle generated by the cutting teeth in rotation of the tool about the axis of said shaft may be increased, without stressing the arms in circumferential directions, by tightening the compression means against the hub to exert thereon a force sufficient to increase the axial divergence of said arms.

EVANS M. STAPLES.

REFERENCES CITED

The following references are of record in the file of this patent:

UNITED STATES PATENTS

| Number | Name | Date |
|---|---|---|
| 393,775 | McConnell | Dec. 4, 1888 |
| 1,275,078 | Nesbitt | Aug. 6, 1918 |
| 1,438,653 | Koeln | Dec. 12, 1922 |
| 1,477,651 | Koeln | Dec. 18, 1923 |
| 1,485,652 | Wakefield et al. | Mar. 4, 1924 |
| 1,620,536 | Gairing | Mar. 8, 1927 |